United States Patent [19]
Law et al.

[11] 3,886,831
[45] June 3, 1975

[54] ELECTROHYDRAULICALLY CONTROLLED CUT OFF SAW

[75] Inventors: Anthony G. Law, East Cleveland, Ohio; James E. Johnson, Smithfield, Mich.

[73] Assignee: Chase Brass and Copper Co., Cleveland, Ohio ; by said Anthony G. Law

[22] Filed: Apr. 24, 1974

[21] Appl. No.: 463,772

[52] U.S. Cl. ............... 83/294; 83/295; 83/319; 83/369
[51] Int. Cl.² ............................ B26D 1/56
[58] Field of Search ........... 83/285, 293, 294, 295, 83/318, 319, 320, 369

[56] References Cited
UNITED STATES PATENTS

| | | | |
|---|---|---|---|
| 1,946,926 | 2/1934 | Barton | 83/318 X |
| 3,251,255 | 5/1966 | Bauman | 83/369 X |
| 3,481,520 | 12/1969 | Pickering | 83/369 X |
| 3,490,322 | 1/1970 | Romes | 83/295 X |

Primary Examiner—J. M. Meister
Assistant Examiner—Fred A. Silverberg
Attorney, Agent, or Firm—John L. Sniado; Walter Kruger

[57] ABSTRACT

A flying saw for cutting continuously moving stock is provided in conjunction with an electrohydraulic control system for accurately tracking the stock. This is accomplished by producing a plurality of pulses, each pulse being indicative of a predetermined increment of movement of the stock, moving the saw in response to a tracking system which receives the pulses and causes the saw to move to a predetermined position with respect to the stock and at the same speed as the stock, cutting the stock, stopping the forward movement of the saw, and returning the saw to a start position.

7 Claims, 1 Drawing Figure

ELECTROHYDRAULICALLY CONTROLLED CUT OFF SAW

This invention relates to a high speed cut off saw known in the art as a flying saw.

More particularly, the invention relates to a cut off saw for cutting continuously moving stock traveling at speeds on the order of 500 feet per minute, within ± 1/16th of an inch, where the saw is precisely controlled by an electrohydraulic system responsive to pulses each indicative of a predetermined increment of movement of the stock to be cut.

In the past, various types of "flying saws" have been controlled hydraulically and mechanically to cut continuously moving stock, without interfering with the travel of the stock. Many of these mechanisms are now in use for cutting stock produced in a drawing mill or by other apparatus, and operate satisfactorily to cut stock to length where the stock travels at a relatively low speed on the order or perhaps 250 feet per minute.

Even at relatively low speeds of stock travel, it is necessary for the saw to move with the stock at a speed approximately the same as the speed of travel of the stock. Where the saw and the stock do not travel at approximately the same speed, saw blade breakage frequently occurs.

Where the stock and the saw do not travel at precisely the same speed, several adverse effects are noted. First, the kerf cut by the saw is substantially wider than the width of the saw blade. As a result, the saw does far more work then it should, and the blade dulls rapidly because the saw will cut some of the stock in a direction parallel to the axis of rotation of the saw blade. Such side cutting or plowing quickly dulls the blade and requires frequent blade replacement.

While various mechanical and hydraulic arrangements have been used in the past in an effort to overcome the problems mentioned above, by moving the saw with the work piece at a speed precisely the same as the stock, during the time a cut is made, most of these arrangements have not been wholly successful at high speeds of stock travel, and those which are reliable are very complex and expensive.

One problem frequently encountered with stock moving at very high rates of speed is the distance the saw must travel in a direction parallel with the stock in order to accelerate the saw to the speed of the stock. Unless the saw can be accelerated rapidly, the required travel of the saw becomes prohibitive. In addition, where the stock is moving at very high speeds, positional errors frequently occur with prior art apparatus which cause the saw to cut off stock of unequal length with uneven ends, precise length repeatability being difficult to attain with such apparatus.

In accordance with this invention, a flying saw is provided which includes an electrohydraulic control system for accurately tracking the stock even at stock speeds on the order of 500 feet per minute. This is accomplished, in accordance with the invention, by producing a plurality of pulses, each pulse being indicative of a predetermined increment of movement of the stock, moving the saw in response to a tracking system which receives the pulses and causes the saw to move to a predetermined position with respect to the stock and at the same speed as the stock, cutting the stock, stopping the forward movement of the saw, and returning the saw to a start position. Additional cutting cycles are initiated in response to the occurrence of a predetermined total number of pulses.

The pulses indicative of the stock movement are translated into a position signal which signal is compared with a position signal indicative of the position of the saw from its start position. Any deviation results in the generation of error signal which causes the electrohydraulic system to adjust the speed and position of the saw to correspond to a predetermined precise point on the stock and to the precise speed of the stock. By virtue of the accuracy of the system of this invention, the necessary acceleration and positioning of the saw can be accomplished in a very short period of time, on the order of a small fraction of a second. The system is sufficiently accurate that the desired speed and position are reached within one half second of an initial start signal, and the saw then tracks the stock at the same velocity as the stock. The saw is traversed to cut the stock in response to the location of the saw with respect to its start position. By virtue of this technique, the stock is always cut at the same precise distance from an immediately preceding cut. Since the stock and saw are moving at precisely the same speed when the cut is made, long saw blade life is obtained. During normal operation, 30,000 cuts of ½-inch diameter stock can be made before the blade requires resharpening and blade breakage is virtually eliminated. The cut ends are square, smooth, and burr free.

In accordance with the preferred embodiment of the invention, a carriage is mounted on guides for movement parallel with the direction of travel of the stock. The carriage includes a slide moveable transverse to the direction of movement of the stock. The saw and its hydraulic drive motor are mounted on the slide to move across the path of travel of the stock, so the saw blade cuts the stock. Transverse movement of the motor and saw is controlled by a cam arrangement which causes the saw blade and motor to advance to cut the stock and which retracts the blade immediately after the cut, as the carriage moves longitudinally with the stock. Shortly after the blade is retracted, the carriage is stopped at the end of its forward travel with the stock. A return or reverse travel of the carriage is initiated by a predetermined pulse count in the control counter. During the return travel of the saw carriage the cam is disabled and the saw does not traverse.

It is preferred that the carriage be moved along the path of travel of the stock by a hydraulic cylinder operated by a servo valve controlled by the tracking system. The tracking system includes a stepping motor which drives a command synchro electrically coupled to a feedback synchro which is driven in response to movement of the carriage. At a predetermined count the counter discontinues pulses to the command synchro stepping motor, and the servo valve closes, thereby decelerating and stopping the carriage. Stopping the carriage in response to the stopping of the command synchro maintains the synchros in synchronism.

The return travel of the carriage is also controlled by the command synchro. This is accomplished by stepping the stepping motor in reverse in response to pulses from the pulse generator which are switched to a reverse gate upon attainment of a predetermined count in the counter, this count being approximately one half the total number of pulses for an entire forward and return cycle of the carriage. This return stroke, under the control of the command synchro, again assures that the feedback synchro and command synchro are in phase and synchronized at the start of the next cutting cycle.

Where it is desired to change the length of the stock cut by the apparatus, such change of length is accomplished quite simply by changing the pulse count at which the counter resets. The effect of increasing the count before the counter resets is merely to cause the carriage to remain motionless at the end of its forward stroke for a longer period of time before its return stroke is initiated, and to remain motionless at its start or home position a longer period of time before the carriage begins to move with the stock. Since the carriage tracks the stock in accordance with the frequency of the pulses, it is assured that the carriage is always traveling at the speed of the stock at the time the cam traverses the carriage slide to cut the stock. By virtue of this arrangement, stock can be cut into any desired length, as well as standard lengths of, for example, 10 feet, 12 feet, etc., the minimum length which can be cut accurately, being slightly greater than the sum of the forward and return travel of the carriage.

To prevent chattering while the saw blade is actually cutting the stock, the stock is lightly clamped between smooth jaws which hold the stock. Such clamping occurs as a result of the attainment of a predetermined count in the counter, the count being so selected that the jaws close shortly before the carriage reaches the traversing cam which causes the saw to cut the stock. These jaws are automatically opened as a result of the attainment of a second predetermined count in the counter which is slightly lower than the count which causes the carriage to stop at the end of its forward travel. An alternate cycle switch arrangement in the counter eliminates the clamping during the return stroke of the carriage.

Correspondingly, an object of the invention is a unique flying saw controlled in accordance with movement of the stock to be cut, where forward and reverse travel of the saw along the stock is controlled in response to movement of the stock.

Another object is a flying saw in which the saw is accelerated to a predetermined position with respect to the stock and is then driven at a velocity corresponding to the stock so a traverse mechanism causes the saw to cut the stock at a precise predetermined location along the stock.

A further object is a method of cutting stock to a desired length where the forward and return strokes of the saw are controlled in response to pulses indicative of the position of the stock, and the traverse of the saw to cut the stock is a function of the position of the saw from a home or start position.

Numerous other objects, features, and advantages of this invention will be apparent with reference to the accompanying drawing which forms a part of this specification.

BRIEF DESCRIPTION OF THE DRAWING

Referring now to FIG. 1, the flying saw of this invention and its controls are shown schematically. As shown at FIG. 1, stock in the form of a rod 10 is fed horizontally along a predetermined straight line path from a mechanism such as a draw block (not shown) which is producing the rod. The block is upstream of the arrow 12 which designates the direction of travel of rod 10.

Figure 1:
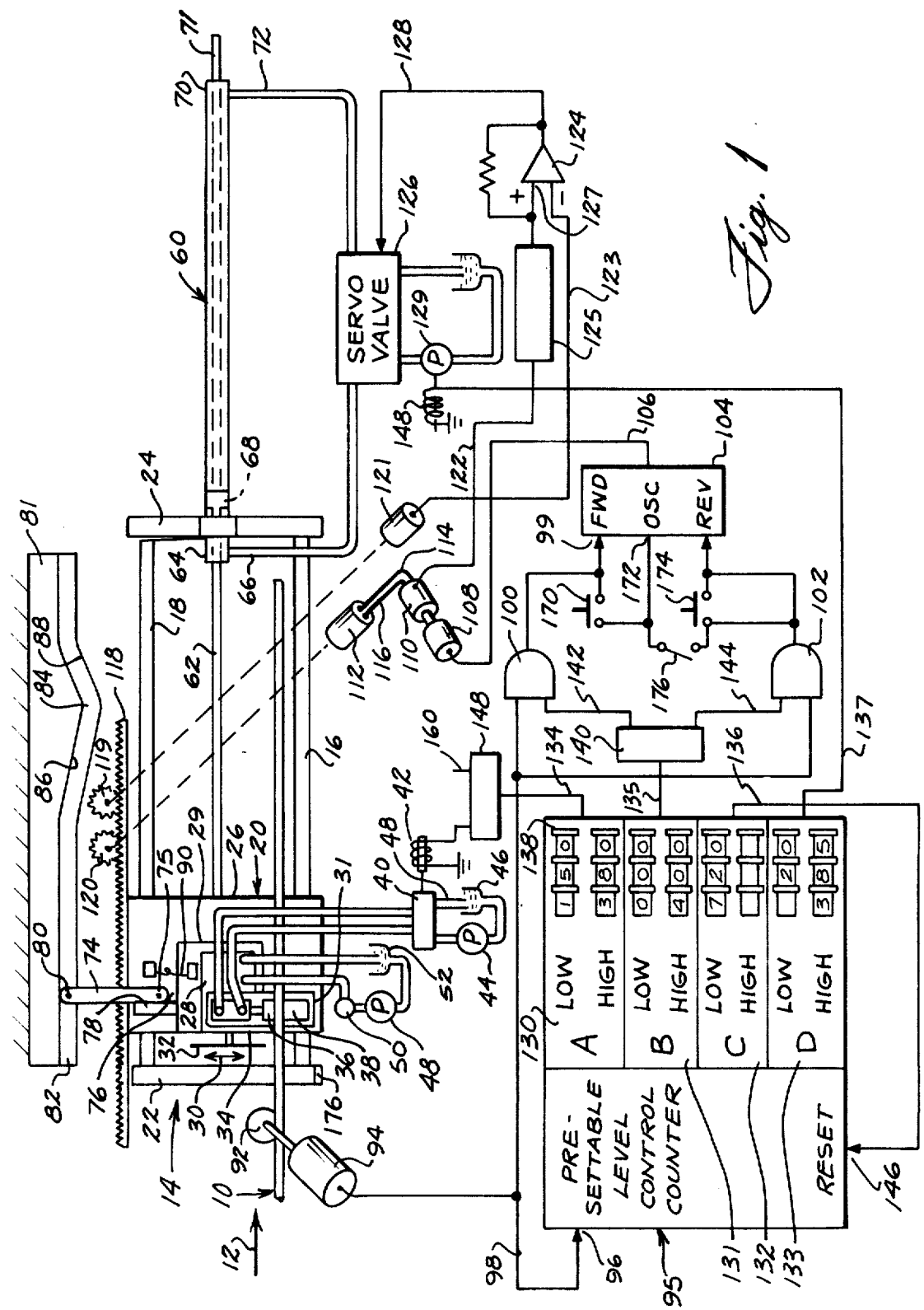
FIG. 1 shows a schematic representation of a cut off saw and control arrangement incorporating the invention.

The cut off saw apparatus 14 includes a pair of parallel guides 16 and 18 which are parallel with the path of travel of rod 10. End members 22 and 24 are secured to the respective ends of the guides 16 and 18 to provide a rigid frame work.

Mounted on guides 16 and 18 is a saw assembly 20 which includes a carriage 26 moveable along the guides between end member 22 and end member 24. A hydraulic motor 28 is mounted on a cross slide 29 of carriage 26 which can move (as shown by arrow 30) in a direction transverse to the path of rod 10. A circular saw blade 32 is secured to the shaft of motor 28. Thee blade 32 is in a plane perpendicular to the path of rod 10.

Secured to a base part 31 of carriage 26 which does not reciprocate transversely with the motor and saw blade is a clamp cylinder 34 having its piston rod connected to a moveable clamp element 36. Opposite clamp element 36 is a backup block 38 secured to carriage 26, and against which rod 10 is clamped when cylinder 34 is actuated to its extended position. Cylinder 34 is operated by a reversing valve 40 controlled by a solenoid 42. Hydraulic fluid is supplied by a pump 44 which receives the fluid from a receptacle 46 communicating with a vent line 48 of the valve.

Hydraulic motor 28 is driven by hydraulic fluid from a pump 48 via a speed control valve 50 which permits regulating the speed of the motor. The exhaust from hydraulic motor 28 returns to a receptacle 52 communicating with pump 49.

Saw assembly 20 is moved along the path of travel of rod 10 by a hydraulic cylinder 60 which is of the double rod end type. One rod 62 of the cylinder is connected to carriage 26 and the cylinder is secured to end plate 24. When hydraulic fluid is forced into end 64 of the cylinder via the pipe 66, piston 68 moves to the right, as shown at FIG. 1 and correspondingly, pulls saw assembly 20 to the right. When fluid is introduced into end 70 of the cylinder via the pipe 72, the piston and saw assembly 20 move to the left. Rod 71 of the cylinder is provided so the opposite faces of the piston 68 have equal areas, this arrangement enabling the same controls (without adjustment or compensation) to move the carriage in both the forward and reverse directions. A follower arm 74 is pivotally connected, at a pivot 75, to a block 76 of the cross slide 29 of carriage 26. Block 76 has a stop shoulder 78 which prevents follower arm 74 from pivoting beyond a position perpendicular to the path of travel of rod 10, in a counterclockwise direction, but permits the follower arm to pivot in a clockwise direction, as viewed at FIG. 1. This pivot arrangement for follower arm 74 causes the arm to remain in a position perpendicular to rod 10 during the travel of carriage 26 to the right, (in a forward direction), but permits the arm to pivot when the carriage is moved to the left in a reverse direction. By virtue of this arrangement, when the saw apparatus 20 is pulled to the right toward end plate 24, a cam track 82, within which follower arm roller 80 moves, causes motor 28 and saw blade 32 to reciprocate transversely as the follower roller moves along the cam. The height of nose 84 is such that blade 32 is driven completely through rod 10 to saw the rod. The forward face 86 of the cam has a gradual rise, whereas the rear face 88 has a sharp drop and correspondingly, the saw blade is gradually driven through the work by face 86 and is pulled back quickly when the follower roller 80 moves along return face 88. During reverse travel of carriage 26, toward end member 22, follower arm 74 can pivot clockwise about pivot 75 so no transverse motion is transmitted to the motor 28 when the cam follower roller 80 moves along faces 88 and 86 of the cam track. Correspondingly, it is apparent that blade 32 is reciprocated through the path of travel of rod 10 to saw the rod only during the forward travel of the carriage when the carriage moves toward end 24.

Frictionally engaging rod 10 is a drive wheel 92 which drives a pulse generator 94. The pulse generator and wheel diameter are so selected that a pulse is produced is response to each predetermined increment of travel of rod 10. In accordance with the invention, it is preferred that the pulse generator produce one pulse during each 0.1 inch of travel of rod 10. The pulses from pulse generator 94 go to the input terminal 96 of a counter 95 via line 98, and go to one input of each of AND gates 100 and 102. Assuming that AND gate 100 is enabled AND gate 102 is disabled, the pulses appear at a forward terminal 99 of a stepping motor power supply 104. The output of the power supply at line 106 is a plurality of pulses of proper form to drive stepping motor 108 in a forward direction. (The designation forward with respect to the rotation of stepping motor 108 corresponds to the forward travel of carriage 26 to the right from end 22 toward end 24.) Rotation of stepping motor 108 in a forward direction correspondingly causes a command synchro 110 in the form of a synchro transmitter to rotate in a forward direction.

Command synchro 110 is electrically coupled to a feedback synchro 112 in the form of a synchro transformer via lines 114 and 116. Feedback synchro 112 is driven in response to travel of carriage 26 by a gear tooth rack 118 secured to the carriage and which is in mesh with a pinion 120 connected to the shaft of feedback synchro 112.

Also in mesh with rack 118 is a pinion 119 connected to the shaft of a negative feedback tachometer 121. The output of tachometer 121 is connected to a linear servo amplifier 124 via line 123, the tachometer 121 serving to minimize overshoot of the carriage 26 as will soon be explained.

The positional error signal of the command synchro 110 with respect to feedback synchro 112 is connected to the input of a demodulator 125 via an error line 122. The output of the demodulator 125 is connected to input 127 of servo amplifier 124.

So long as command synchro 110 is in positional synchronism with respect to feedback synchro 112, no error signal appears on error line 122. Correspondingly, the outputs of demodulator 125 and servo amplifier 124 are such that servo valve 126 is in a neutral or closed position. Correspondingly, piston 68 of cylinder 60 is at rest, and carriage 26 remains stationary.

Assume now that command synchro 110 is driven in a forward direction by stepping motor 108 as a result of pulses at the forward terminal 99 of power supply 104. The first increment of forward rotation of synchro 110 causes this command synchro to lead feedback synchro 112 in a forward direction thereby creating an error signal on error line 122 which is converted by demodulator 125. This signal is amplified by amplifier 124 and goes to servo valve 126 via line 128 to immediately cause the servo valve to open and direct hydraulic fluid to end 64 of the cylinder while venting fluid from end 70 of the cylinder (assuming that carriage 26 is in its start or home position shown at FIG. 1). Since the pulses to stepping motor 108 cause continued rotation of command synchro 110, the eerror signal increases thereby further opening the valve and accelerating the carriage in a forward direction. The forward movement of the carriage on the other hand rotates feedback synchro 112 in a forward direction toward synchronism with command synchro 110.

The system is arranged so that, while carriage 26 is moving at the speed of the workpiece, the lag between feedback synchro 112 and command synchro 110 is essentially constant. As a result of this lag or error, a constant error signal appears at input terminal 127 of servo amplifier 124 from the demodulator 125. This maintains servo valve 126 in an essentially constant position when the carriage is accurately tracking rod 10. The synchro phase error only changes when the carriage is required to change speed which occurs as a result of a change in the rate of rotation of the command synchro. However, once the carriage speed is synchronized with the speed of travel of rod 10, there is no further change of synchro phase error so long as the rod speed remains constant. The negative feedback tachometer 121 has the effect of eliminating overshoot during acceleration of the carriage to a speed corresponding to the speed of rod 10. Since the output of tachometer 121 is of a polarity opposite to the polarity of the demodulator error signal at input terminal 127 of servo amplifier 124, this output of the tachometer will increase to oppose the error signal as the speed of the carriage increases thereby reducing the control signal on line 128 from the servo amplifier, and minimizing overshoot.

The counter 95 and its associated level controls control clamp cylinder 34, the movement of the carriage by controlling the direction of rotation of stepping motor 108, the number of pulses that are fed to the stepping motor, and the pressure of fluid from pump 129 which operates cylinder 60.

Counter 95 is a presetable counter with several predetermined level control units such as the low-high level control units A, B, C and D, which are numbered respectively 130–133, and have respective output lines 134–137. Level control units 130–133 can each be of the type in which a control switch closes when the preset low level count is reached by the counter, and opens when the preset high level count is reached by the counter. Suitable power supplies (not shown) are connected to the respective level control units 130–133 to provide the desired outputs on the respective lines 134–137 when the respective level control switches close.

Output line 134 of level control unit 130 is connected to solenoid 42 which operates valve 40 that controls clamp cylinder 34. The low level of level unit 130 is set to switch on at a count in the counter of 150, and this count level for the switching is set by manipulating the appropriate thumb wheels 138. The high level or switch off condition is set to occur at a count in the counter of 380. Correspondingly, clamp cylinder 34 is actuated to move clamp 36 to clamp rod 10 against block 38 when the count in the counter reaches 150, and clamp 36 is retracted when the count in the counter reaches 380. Since each pulse from pulse generator 94 equals 0.1 inch of travel of rod 10, clamp 36 closes in response to a travel of 15 inches of rod 10, and opens in response to a travel of 38 inches of rod 10 from a predetermined initial position.

Level control unit 131 is set to switch ON at a zero count in the counter 95 and to switch off at a count of 400. Output line 135 is connected to a flipflop 140 having output lines 142 and 144 connected respectively to AND gates 100 and 102. The flipflop is preferably of the type which switches in response to the occurrence of a signal on line 135. The flipflop is preset so that when carriage 26 is in its home or start position there is electrical communication between line 135 and line 144. However, in this initial home position, there is no signal on line 135, unless the count in the counter is between 0 and 400.

Level unit 132 has its output line 136 connected to a reset terminal 146 of counter 95. As shown, thumb wheel switches 138 of level unit 132 for the low level are set at the number 720, and upon the attainment of this count in the counter, a signal appears on line 135 which causes the counter to reset to zero. The numeral set at the low level of level control unit 132 determines the count at which the counter resets. As will soon be explained, the count set in the low level of level unit 132 determines the length to which rod 10 will be cut.

Level unit 133 has its output line 137 connected to a solenoid actuator 148 of pump 129. Pump 129 is a pump of the type which can be selectively switched to provide a high pressure or a low pressure. This pump can be a Vickers variable volume in-line piston type pressure compensating pump, such as model PVB-20-S-20 (11 series), which can be switched from a low pressure to a high pressure by energizing its solenoid actuator 148. The pump selected is advantageously operated at a low pressure on the order of 500 psi and a high pressure on the order of 2,000 psi. Level control unit 133 is set to switch on at a low count in counter 95 of approximately 20, and to switch off at a high count in the counter on the order of 385. Correspondingly, during the interval between pulses 20 and 385, line 137 is energized thereby energizing solenoid 148 so pump 129 has a discharge pressure on the order of 2,000 psi. At any count in the counter outside the 20-385 count the pressure output of pump 129 is in the low range on the order of 500 psi.

OPERATION

The operation of the flying saw during a forward and return stroke will now be explained. For purposes of explanation, assume that carriage 26 has just returned to its home or start position from a previous cutting cycle and that the count in the counter, while above 400, is still below the count of 720 at which counter 95 resets. In this condition of the apparatus, rod 10 is traveling and pulses generated by pulse generator 94 are received by counter 95. Flipflop 140 is at this time in its set position so line 135 is connected to line 144, but there is no signal on line 144 because of the absence of a signal on line 135. In this initial position of the carriage, command synchro 110 is in sychronism with feedback synchro 112.

When the count is the counter reaches the number 720, a signal appears on line 136 which causes counter 95 to reset to zero. At zero count a signal appears at line 135 of level unit 131, which switches flipflop 140 so the signal on line 135 appears on line 142 and enables AND gate 100. With gate 100 enabled, the pulses from pulse generator 94 are gated to the forward terminal of the power supply 104 and cause stepping motor 108 to drive command synchro 110 in a forward direction. This produces an unbalance between command synchro 110 and feedback synchro 112 which results in an error signal on line 122 which is converted by demodulator 125 and in response to which amplifier 124 energizes servo valve 126 to introduce fluid to end 64 of cylinder 60. This immediately causes carriage 26 to accelerate. Since command synchro 110 and feedback synchro 112 are position synchronous devices, the carriage will track a particular point of the rod.

The point on the rod which the saw blade tracks is a point which is upstream of the saw blade at the instant the carriage 26 begins to accelerate. Since acceleration cannot be instantaneous, the rod 10 moves a slightly greater distance than the carriage during acceleration, then the carriage precisely tracks the rod. It has been found, however, that the acceleration characteristics are so uniform, that no cut position error occurs. By virtue of this mode of operation, coupled with the negative feedback signal from tachometer 121, there is little if any overshoot when the carriage reaches a velocity the same as the velocity of rod 10. The carriage travels the same speed as the rod, tracking a particular point on the rod by virtue of the error signal from the feedback and command synchro. When servo valve 126 first opens (which occurs at a 0 count in counter 95) to accelerate the carriage to the speed of rod 10, pump 129 is in the low pressure (500 psi) mode to gradually accelerate the carriage initially. As soon as the count of the counter reaches 20, solenoid actuator 148 is actuated to increase the pump pressure to 2,000 psi to more rapidly accelerate the carriage. The decrease of pressure of pump 129 during deceleration of the carriage at the end of the forward stroke occurs at a count of about 385, slightly before servo valve 126 closes. By virtue of the lower pressure during initial acceleration, and during deceleration, the unit is relatively quiet in operation since abrupt accelerations and decelerations of the carriage are avoided and shock free operation of the unit is obtained. When the count in the counter reaches 150 (indicating a rod travel of 15 inches) level control 130 energizes, causing flipflop 148 to switch so line 134 is electrically connected to solenoid 42. This operates clamp cylinder 34 to move clamp 36 against the rod and clamp it to block 38. Continued movement of the carriage as it tracks the rod causes cam 81 to traverse slide 29 so saw blade 32 cuts the rod when follower roller 80 travels along face 86 of the cam. The motor and saw blade retract as roller 82 moves along face 88 of the cam. When the count in the counter reaches 380 (a travel of 38 inches of rod 10) level unit 130 switches off and the signal on line 134 is discontinued, de-energizing solenoid 42 and reversing valve 40. This reverses cylinder 34 thereby releasing clamp 36. At a count of 385 level unit 133 switches off, solenoid actuator 148 is de-energized,, and the pressure of pump 129 decreases to its low level of 500 psi. When the count reaches 400, AND gate 100 is disabled since there is no signal on line 142 to enable the gate. As a result, pulses to stepping motor 108 are terminated and command synchro 110 stops, while feedback synchro 112 continues to rotate. This causes the decreasing error signal on line 122 to immediately close servo valve 126 and decelerate carriage 26. There may be a slight overshoot of the carriage as a result of its mass since it is impossible to decelerate the carriage instantaneously. If such overshoot occurs, the servo valve will momentarily reverse, thereby moving the carriage slightly in a reverse direction until command synchro 110 and feedback synchro 112 are in precise synchronism. The normal lag between feedback synchro 112 and command synchro 110 is usually sufficient to enable the carriage to decelerate without overshoot so the synchro are in synchronism when the carriage stops.

Counter 95 continues to count after the carriage 26 stops, since the rod 10 moves continuously. When the count in the counter reaches the preset number 720 of level unit 132, a signal appears on line 136 which causes the counter to reset. When the counter resets, a signal again appears on line 135 which switches the flipflop 140 and connects line 135 to line 144. The signal appearing at reverse gate 102 on line 144 enables the gate so pulses appear at the reverse input terminal of power supply 104. This causes stepping motor 108 to rotate and drive command synchro 110 in a reverse direction. As a result of the direction of the phase error signal on error line 122, the signal from demodulator 125 to amplifier 124 is such as to reverse servo valve 126 so fluid in introduced to end 70 to cylinder 60 to drive carriage 26 in a reverse direction toward its home or start position. By virtue of the equal areas on both sides of piston 68, the acceleration and velocity of the carriage in the reverse direction is identical to its forward direction travel if the speed of rod 10 remains constant.

During reverse travel of the carriage, when the count in the counter 130 reaches 150, a signal appears on line 134 of level unit 130 which causes flipflop 148 to switch, and hence, even though there is a signal on line 134, solenoid 42 remains unenergized because the line 133 is now connected to the unused output line 160 of the flipflop. Correspondingly, clamp cylinder 34 is inactive during the return stroke of the carriage. As previously explained, cam follower 74 simply pivots with respect to cam track 82 when the carriage is moved in the reverse direction and hence, there is no reciprocation of the slide 29. When the count reaches 380 the level control unit 130 switches off and the signal at line 134 is terminated. Flipflop 148 is now ready to be switched by the next signal on line 134, which will occur during the next forward stroke of the carriage. At the count of 385 the pressure of pump 129 is again decreased.

When the count in the counter 130 reaches the 400 level which is the preset high level of level control 131, the signal on line 135 again terminates, thus terminating the enabling signal on line 144, and terminating pulses to the reverse terminal of power supply of 104. Correspondingly, stepping motor 108 and command synchro 110 stop and carriage 26 stops in the same manner as at the end of its forward stroke, with the command synchro 110 and feedback synchro 112 in precise positional synchronism.

A distinct advantage of the feedback and control arrangement of this invention is that all automatic motion of the carriage is controlled by the cylinder 60 without the need for stops, limit switches, or other shock absorbing mechanisms to halt or decelerate the carriage, during normal operation. This avoids many problems which were prevalent in prior known equipment. For safety purposes, over travel limit switches can of course, be provided to switch off power in the event that the system malfunctions and the carriage moves beyond a predetermined position in either the forward or reverse direction. The switches, however, will operate only in the event of malfunction of the electrohydraulic system.

The saw carriage 26 can be manually traversed selectively in either direction. Such manual traverse is obtained without disturbing the synchronism between command synchro 110 and feedback synchro 112. When it is desired to traverse the carriage in a forward direction, forward control switch 170 is depressed. This connects the forward terminal of stepping motor power supply 104 to oscillator terminal 172 of a pulse producing oscillator contained in the power supply. These pulses rotate stepping motor 108 and command synchro 110 in a forward direction, (in the same manner as pulses from pulse generator 94) and the carriage 26 follows in the manner previously explained. Similarly, if it is desired to jog the carriage in a reverse direction, this can be accomplished manually by depressing reverse control switch 174 which connects the oscillator to the reverse terminal of power supply 104 and causes stepping motor 108 and command servo 110 to step in a reverse direction. The carriage follows by virtue of the operation previously explained.

To enable returning the carriage to the same precise home position, for example, at the start of a run of rod 10, a limit switch 176 physically located on end plate 22, but electrically in series with reverse switch 174 is provided. This switch 176 operates only to terminate the travel of the carriage when the carriage is being moved manually by the closing of reverse switch 174. Since switch 176 only affects the reverse manual travel of the carriage, it plays no part in the automatic control of the carriage.

While a preferred embodiment of a method and apparatus according to this invention are shown and described, changes can be made without departing from the scope of this invention.

We claim:
1. A cut off saw comprising
   a cut off saw moveable along the path of travel of stock to be cut, and moveable transversely through the path of travel of the stock to cut the stock;
   hydraulic cylinder means connected to said saw for moving said saw along the path of travel of the stock in a forward direction the same as the direction of travel of the stock, and in a reverse direction opposite to the direction of travel of the stock;
   electrohydraulic control means for controlling the hydraulic cylinder means during the forward and return movement of the saw;
   pulse generating means for producing a plurality of pulses each indicative of a predetermined increment of travel of the stock;
   means responsive to said pulses for moving said saw along the path of travel of the stock to a predetermined position with respect to the stock and at a speed corresponding to the speed of travel of the stock;
   means for traversing the saw to cut the stock;
   means responsive to a predetermined number of pulses to operate said electrohydraulic control means to stop movement of the saw in the forward direction; and
   means responsive to a second predetermined number of pulses to return the saw to a start position.

2. A cut off saw according to claim 1 which further includes
- counter means for counting pulses from the pulse generating means;
- means responsive to a predetermined count in said counter means for actuating the hydraulic cylinder means to move the saw in the forward direction; and
- means for setting the predetermined count in the counter means to change the length of the stock cut by the saw.

3. A cut off saw according to claim 1, which further includes
- an oscillator for generating pulses; and
- manually operable switch means for connecting said oscillator to said means for moving said saw along the path of travel of the stock, so that the saw can be moved manually to a predetermined position with respect to stock.

4. A cut off saw according to claim 3 which further includes
- limit switch means at said start position for disconnecting the oscillator from the means for moving the saw, in response to manual movement of the saw to said start position.

5. A cut off saw according to claim 1 which further includes
- stock clamp means for clamping the stock to the saw during cutting of the stock; and
- counter means responsive to a first number of pulses for operating the clamp means to clamp the stock, and responsive to a second number of pulses to operate the clamp means to release the stock.

6. A cut off saw according to claim 1 wherein said hydraulic cylinder means comprises
- a cylinder, and
- a piston with a rod of the same size at each end;
- so that the effective area of the piston is essentially the same at both sides of the piston.

7. A cut off saw according to claim 1 wherein said electrohydraulic control means includes
- a synchro transmitter electrically connected to a synchro transformer,
- reversible motor means for driving the synchro transmitter,
- means responsive to said pulses for driving said motor means in forward and reverse directions; and
- means for driving said synchro transformer in response to movement of the saw along the path of travel of the stock.

* * * * *